United States Patent
Saeki et al.

(10) Patent No.: US 11,904,826 B2
(45) Date of Patent: Feb. 20, 2024

(54) DEGRADATION DETECTION SYSTEM, BRAKE CONTROL DEVICE, AND DEGRADATION DETECTION METHOD

(71) Applicant: Mitsubishi Electric Corporation, Tokyo (JP)

(72) Inventors: Tetsuya Saeki, Tokyo (JP); Koji Shiratsuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 674 days.

(21) Appl. No.: 17/054,538

(22) PCT Filed: May 21, 2018

(86) PCT No.: PCT/JP2018/019496
§ 371 (c)(1),
(2) Date: Nov. 11, 2020

(87) PCT Pub. No.: WO2019/224874
PCT Pub. Date: Nov. 28, 2019

(65) Prior Publication Data
US 2021/0245726 A1    Aug. 12, 2021

(51) Int. Cl.
*B60T 17/22*    (2006.01)
*B60T 8/171*    (2006.01)
(Continued)

(52) U.S. Cl.
CPC ............ *B60T 17/228* (2013.01); *B60T 8/171* (2013.01); *B60T 13/683* (2013.01); *F16K 37/0091* (2013.01); *B60T 2270/88* (2013.01)

(58) Field of Classification Search
CPC ...... B60T 17/228; B60T 8/171; B60T 13/683; B60T 13/665; B60T 2270/88;
(Continued)

(56) References Cited

U.S. PATENT DOCUMENTS

2013/0205881 A1    8/2013    Naether et al.

FOREIGN PATENT DOCUMENTS

EP    1751640 B9 *    1/2011    .......... F15B 13/0402
JP    2000272501 A    10/2000
(Continued)

OTHER PUBLICATIONS

Subramanian et al.; Diagnosing the Air Brake System of Commercial Vehicles; Proceedings of the 2006 American Control Conference Minneapolis, Minnesota, USA, Jun. 14-16, 2006; pp. 2567-2572 (Year: 2006).*

(Continued)

*Primary Examiner* — Michael J Zanelli
(74) *Attorney, Agent, or Firm* — BUCHANAN INGERSOLL & ROONEY PC

(57) ABSTRACT

A degradation detection system includes: a storage that stores measured values of command pressure and measured values of response pressure; and a simulator that calculates, using a physical model, the response pressure in accordance with the command pressure, thereby obtaining a waveform of the calculated response pressure corresponding to a waveform of the command pressure in a case in which the command pressure is changed. A waveform identifier identifies a waveform of the calculated response pressure that matches a waveform of the detected response pressure. A degradation identifier identifies a degraded component of a pressure regulating valve from a value of parameter acquired by the waveform identifier and a normal range defined for the parameter.

20 Claims, 13 Drawing Sheets

(51) Int. Cl.
*B60T 13/68* (2006.01)
*F16K 37/00* (2006.01)

(58) Field of Classification Search
CPC .. F16K 37/0091; F16K 37/005; F16K 31/128; F15B 13/0433; F15B 19/005; F15B 19/007; G05D 16/0655
See application file for complete search history.

(56) References Cited

FOREIGN PATENT DOCUMENTS

| | | | | |
|---|---|---|---|---|
| JP | 3754583 B2 * | 3/2006 | | |
| JP | 2012-078994 A | 4/2012 | | |
| WO | 2012/007176 A2 | 1/2012 | | |
| WO | WO-2013131654 A1 * | 9/2013 | ............ | B60T 13/665 |

OTHER PUBLICATIONS

Office Action dated Jul. 31, 2021, in corresponding India Patent Application No. 202027040181 and English translation of the Office Action. (6 pages).

International Search Report (PCT/ISA/210) dated Aug. 21, 2018, by the Japan Patent Office as the International Searching Authority for International Application No. PCT/JP2018/019496.

Written Opinion (PCT/ISA/237) dated Aug. 21, 2018, by the Japan Patent Office as the International Searching Authority for International Application No. PCT/JP2018/019496.

* cited by examiner

US 11,904,826 B2

DEGRADATION DETECTION SYSTEM, BRAKE CONTROL DEVICE, AND DEGRADATION DETECTION METHOD

TECHNICAL FIELD

The present disclosure relates to a degradation detection system, a brake control device, and a degradation detection method.

BACKGROUND ART

Rail vehicles each include a pressure control device that adjusts pressure of fluid supplied from a fluid source, and outputs the fluid, in accordance with an electrical command. An example of the pressure control device is a brake control device. The brake control device controls a mechanical brake by adjusting the pressure of the fluid supplied from the fluid source and outputting, to the mechanical brake, the pressure-adjusted fluid. A vehicle brake control device disclosed in Patent Literature 1 (i) adjusts pressure of air supplied from an air source in accordance with a brake command acquired from a brake operating device and (ii) outputs, to a mechanical brake, the pressure-adjusted air.

CITATION LIST

Patent Literature

Patent Literature 1: Unexamined Japanese Patent Application Publication No. 2000-272501

SUMMARY OF INVENTION

Technical Problem

For example, when a control valve that adjusts pressure in a brake control device deteriorates over time, a desired response of the control valve in accordance with a command is unobtainable. When the desired response of the control valve is unobtainable, pressure output by the brake control device cannot be adjusted to the desired pressure. As a result, the desired braking force is unobtainable. Accordingly, the vehicle brake control device disclosed in Patent Literature 1 (i) detects a deviation of a brake control pressure command from a feedback signal from a pressure sensor and (ii) determines, based on a result of the detection, whether to perform maintenance and inspection of the brake control device. However, although the vehicle brake control device disclosed in Patent Literature 1 can determine whether there is need to perform maintenance and inspection of the vehicle brake control device, the vehicle brake control device cannot identify which component among the components of the vehicle brake control device is degraded. There is also a similar problem in a case of detection of deterioration of pressure control devices other than the brake control device.

In consideration of such circumstances, an objective of the present disclosure is to identify a degraded component of the pressure control device.

Solution to Problem

In order to attain the aforementioned objective, a degradation detection system according to the present disclosure is a degradation detection system for a pressure regulating valve in a pressure control device that includes (i) a conversion valve to adjust a pressure of a fluid supplied from a fluid source based on an electrical command and output the fluid, and (ii) the pressure regulating valve to adjust, in accordance with a pressure of the fluid output by the conversion valve, the pressure of the fluid supplied from the fluid source and output the fluid. The degradation detection system includes a simulator, a waveform identifier, and a degradation identifier. The simulator (i) acquires a command pressure that is the pressure of the fluid output by the conversion valve, (ii) applies the command pressure to a physical model that expresses physical quantities of components of the pressure regulating valve based on a parameter of each of the components of the pressure regulating valve, and (iii) calculates a response pressure that is the pressure of the fluid output by the pressure regulating valve. Additionally, the simulator obtains, by the calculation of the response pressure, a waveform of the calculated response pressure corresponding to a waveform of the command pressure in a case in which the command pressure is changed. The waveform identifier (i) acquires a detected response pressure that is a detected value of the response pressure corresponding to the command pressure and (ii) identifies a waveform of the calculated response pressure that matches a waveform of the detected response pressure and the parameter of the physical model used for obtaining the waveform of the response pressure. The degradation identifier identifies a degraded component among the components from a value of the parameter, identified by the waveform identifier, of the physical model used for obtaining the waveform.

Advantageous Effects of Invention

According to the present disclosure, by (i) obtaining, based on the physical model, the waveform of the calculated response pressure and (ii) identifying the waveform that matches the waveform of the detected response pressure, a degraded component can be identified from the parameters of the physical model used for obtaining the waveform of the response pressure.

DESCRIPTION OF EMBODIMENTS

Degradation detection systems according to embodiments of the present disclosure are described below in detail with reference to drawings. Components that are the same or equivalent are assigned the same reference signs throughout the drawings.

Embodiment 1

Figure 1:
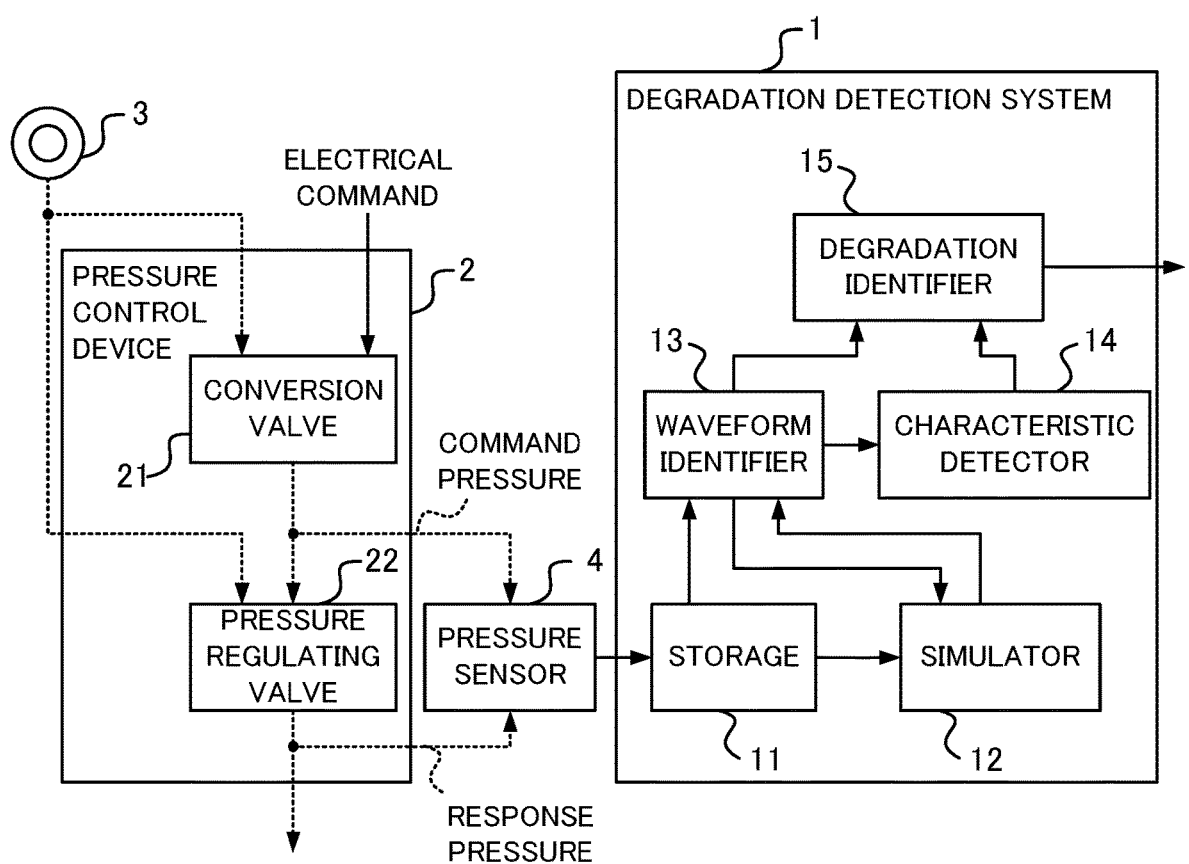
FIG. 1 is a block diagram illustrating a configuration of a degradation detection system according to Embodiment 1 of the present disclosure.

A degradation detection system 1 according to Embodiment 1 of the present disclosure illustrated in FIG. 1 identifies a degraded component of a pressure regulating valve 22 in a pressure control device 2 including a conversion valve 21 and the pressure regulating valve 22. In FIG. 1, a flow of a fluid is indicated by a dashed arrow, and an electrical command is indicated by a solid arrow. The conversion valve 21 adjusts a pressure of the fluid supplied from a fluid source 3 in accordance with the electrical command and outputs the pressure-adjusted fluid. The pressure regulating valve 22 adjusts the pressure of the fluid supplied from the fluid source 3 in accordance with pressure of the fluid output by the conversion valve 21 and outputs the pressure-adjusted fluid. In Embodiment 1, air is used as the fluid. Hereinafter, for distinction between these pressures, the pressure of the fluid output by the conversion valve 21 is referred to as command pressure, and the pressure of the fluid output by the pressure regulating valve 22 is referred to as response pressure. A pressure sensor 4 (i) detects a value of the command pressure and a value of the response pressure and (ii) outputs, to the degradation detection system 1, a measured value of the command pressure and a measured value of the response pressure. However, in a configuration of the present application, the pressure regulating valve 22 can be replaced with a pressure control valve, and the configuration of the present application is not limited to use of the pressure regulating valve. This is because the degradation detection system provided in the pressure regulating valve 22 can exert an effect when the pressure regulating valve 22 is replaced with a general valve including a mechanical element having a role of adjusting pressure.

The degradation detection system 1 includes a storage 11 that (i) acquires, from the pressure sensor 4, the measured value of the command pressure and the measured value of the response pressure and (ii) stores these measured values. The degradation detection system 1 further includes a simulator 12 that calculates the response pressure from a physical quantity obtained by applying to a physical model the command pressure stored in the storage unit 11, thereby obtaining a waveform of the calculated response pressure corresponding to a waveform of the command pressure in a case in which the command pressure is changed. In this case, the term "physical quantity" means a variable that appears in a physical equation that represents the internal movement of the pressure regulating valve 22. For example, when elements modeled with a spring-mass-damper system structure are included in the physical model for the simulator 12, a spring coefficient, a damper coefficient, and a mass are set as parameters, and a position, speed, acceleration and acting force of a reference element such as a mass are defined as physical quantities. In consideration that not only the spring-mass-damper system but also a movement of a piston in response to a change in pressure are added until the response pressure is output, pressure, effective area and frictional force are included in elements that generate the acting force. Also, the simulator 12 can perform precise physical modeling of the change in pressure, and, for example, the physical model for the change of pressure can be expressed as a physical model using a first-order lag element or a dead time element. A general response for obtaining the response pressure by the simulator 12 is such that (i) the physical quantity changes via the physical model upon an increase of the command pressure and (ii) pressure finally reaches a certain response pressure after a certain period of time elapses. In the following description, a time history of a freely-selected physical quantity, that is, a plot in which the freely-selected physical quantity is plotted on the vertical axis and time is plotted on the horizontal axis, is referred to as a waveform. The physical model expresses, by a mathematical equation, the physical quantities of the respective components of the pressure regulating valve 22 based on the parameters for the respective components. The simulator 12 applies, to the physical model, parameters acquired from a later-described waveform identifier 13. As described later, the parameters include a friction coefficient of a contact surface between a valve body and a housing that are included in the pressure regulating valve 22. The degradation detection system 1 further includes the waveform identifier 13 that identifies a waveform based on the measurement value of the response pressure stored in the storage 11, that is, a waveform of the calculated response pressure that matches a waveform of the detected response pressure.

The waveform identifier 13 obtains, from the simulator 12, a plurality of waveforms of calculated values of the response pressure by repeatedly performing the processing by the simulator 12 with changing the parameters. The waveform identifier 13 identifies, from among the plurality of waveforms of the calculated response pressure acquired from the simulator 12, a waveform that matches the waveform of the detected response pressure. Additionally, the parameters used for identifying the waveform of the calculated response pressure are sent to a degradation identifier 15.

The degradation detection system 1 includes a characteristic detector 14 that detects a characteristic of the waveform identified by the waveform identifier 13. The degradation detection system 1 further includes the degradation identifier 15 that identifies a degraded component of the pressure regulating valve 22 from the values of the parameters acquired from the waveform identifier 13, normal ranges determined for the respective parameters, and the characteristic acquired from the characteristic detector 14. The degradation identifier 15 outputs information indicating the degraded component.

Figure 2:
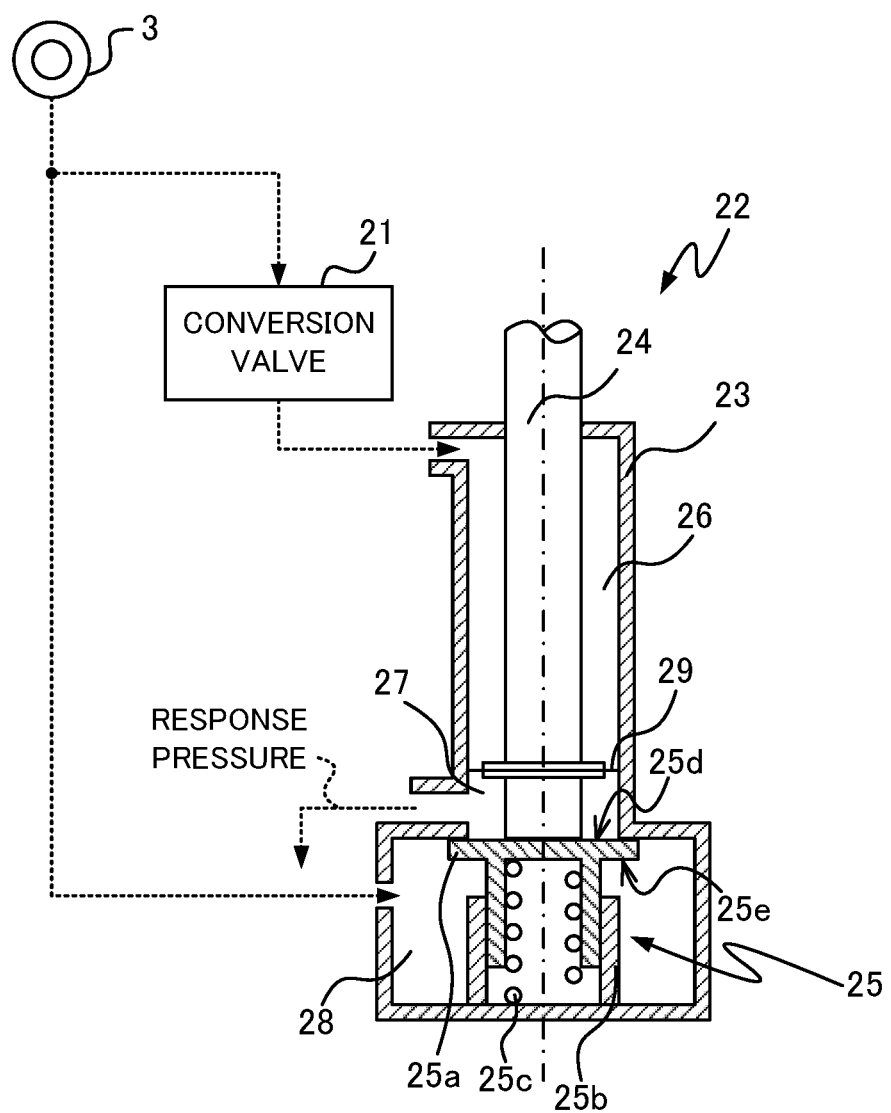
FIG. 2 is a diagram illustrating a configuration of a pressure regulating valve according to Embodiment 1.

The pressure regulating valve 22 for which a degradation detection is performed by the degradation detection system 1 is described in details. As illustrated in FIG. 2, examples of the pressure regulating valve 22 can include a valve that includes a housing 23 and a piston 24 that reciprocates inside the housing 23. The piston 24 has a hollow cylindrical shape. The piston 24 reciprocates in the axial direction indicated by the dashed-dotted line illustrated in FIG. 2. In the following description, a direction from the piston 24 toward a valve body 25 is referred to as a first direction, and a direction from the valve body 25 toward the piston 24 is referred to as a second direction. The pressure regulating valve 22 further includes the valve body 25 that is changed by the piston 24 pushing the valve body. The valve body 25 includes (i) a movable portion 25a that moves due to pushing by the piston 24, (ii) a fixed portion 25b that is attached to the housing 23, and (iii) an elastic member 25c that urges a surface of the movable portion 25a facing the piston 24 to move toward the piston 24. The interior of the housing 23 is divided into a control chamber 26, an output chamber 27, and a supply chamber 28. The control chamber 26 and the output chamber 27 are separated by a membrane plate 29. The fluid is supplied from the conversion valve 21 to the control chamber 26. The fluid is supplied from the fluid source 3 to the supply chamber 28. The fluid is output from the output chamber 27, and pressure of the fluid output from the output chamber 27 is the response pressure detected by the pressure sensor 4.

Figure 3:
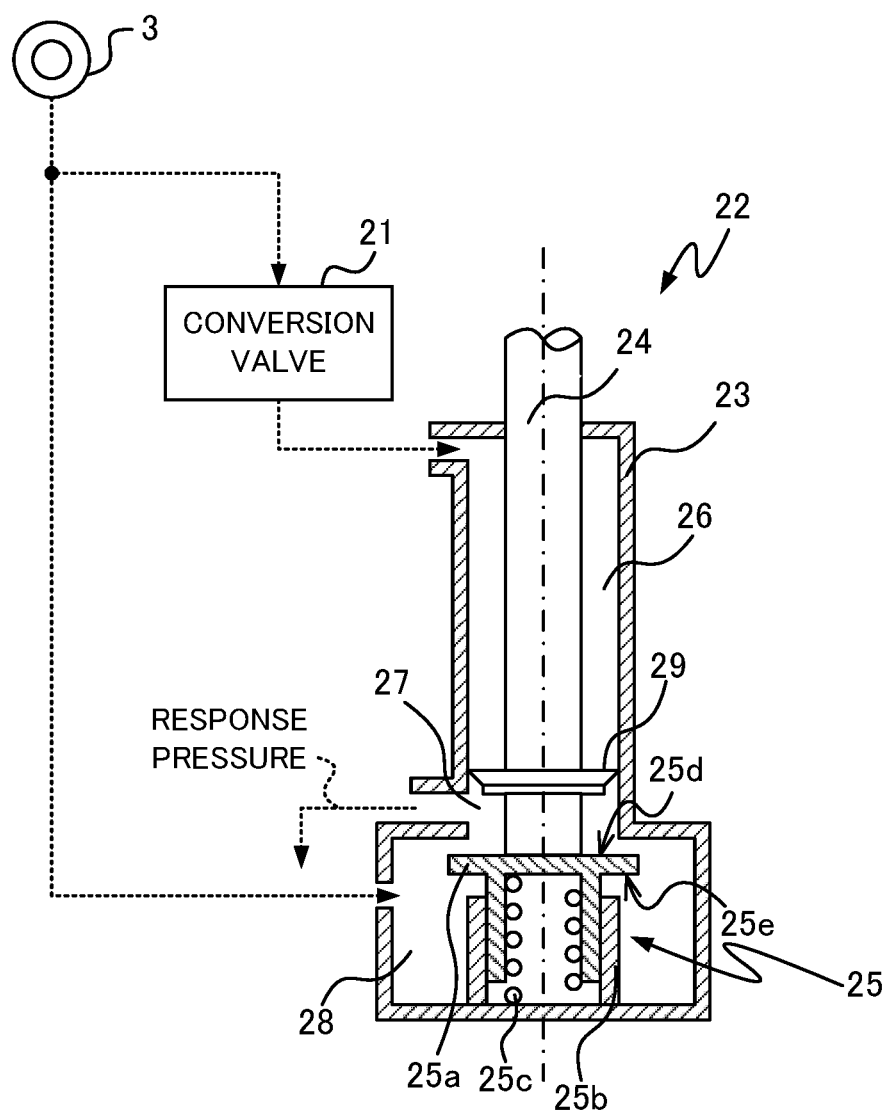
FIG. 3 is a diagram illustrating a configuration of the pressure regulating valve according to Embodiment 1.

When the command pressure increases, the internal pressure of the control chamber 26 increases, and the piston 24 moves in the first direction. The movable portion 25a is pushed by the piston 24, thereby causing a gap between the valve body 25 and the housing 23 as illustrated in FIG. 3. As a result, the fluid supplied from the fluid source 3 flows through the supply chamber 28 into the output chamber 27, and the internal pressure of the output chamber 27 increases. When the internal pressure of the output chamber 27 increases so that the internal pressure of the control chamber 26 and the internal pressure of the output chamber 27 are balanced, the piston 24 is pushed in the second direction by the elastic force of the elastic member 25c and returns to a position illustrated in FIG. 2.

Figure 4:
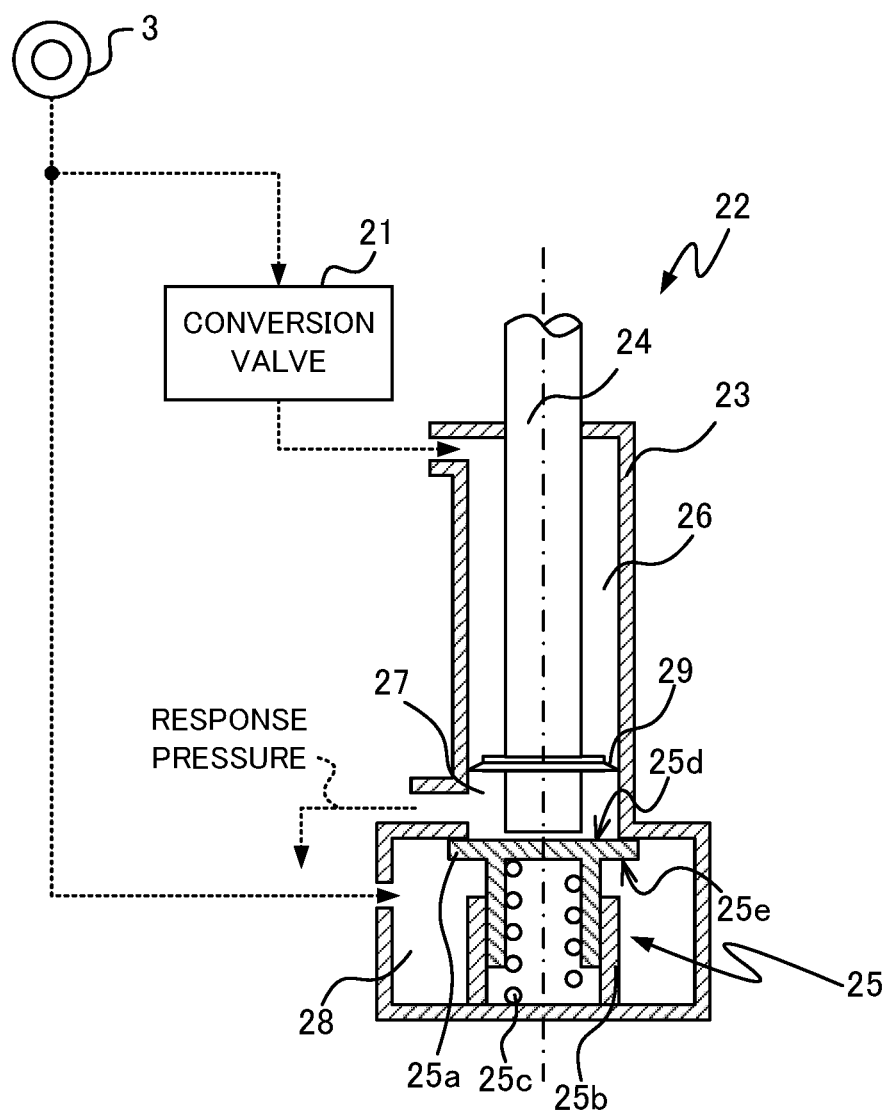
FIG. 4 is a diagram illustrating a configuration of the pressure regulating valve according to Embodiment 1.

When the command pressure decreases, the internal pressure of the control chamber 26 decreases, and the piston 24 moves in the second direction. As a result, as illustrated in FIG. 4, the piston 24 moves away from the movable portion 25a. The fluid in the output chamber 27 passes through the piston 24 and is discharged from a non-illustrated exhaust chamber, and the internal pressure of the output chamber 27 decreases. When the internal pressure of the control chamber 26 and the internal pressure of the output chamber 27 are balanced, the piston 24 returns to the position illustrated in FIG. 2.

Figure 5:
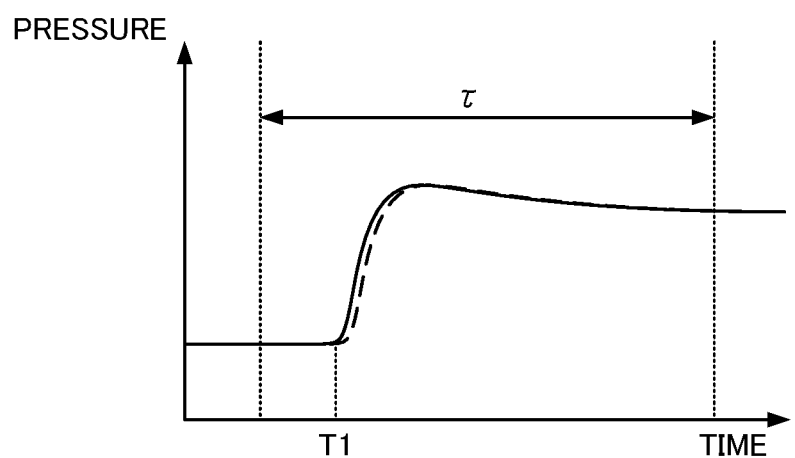
FIG. 5 is a graph illustrating examples of a command pressure and a response pressure in Embodiment 1.
Figure 6:
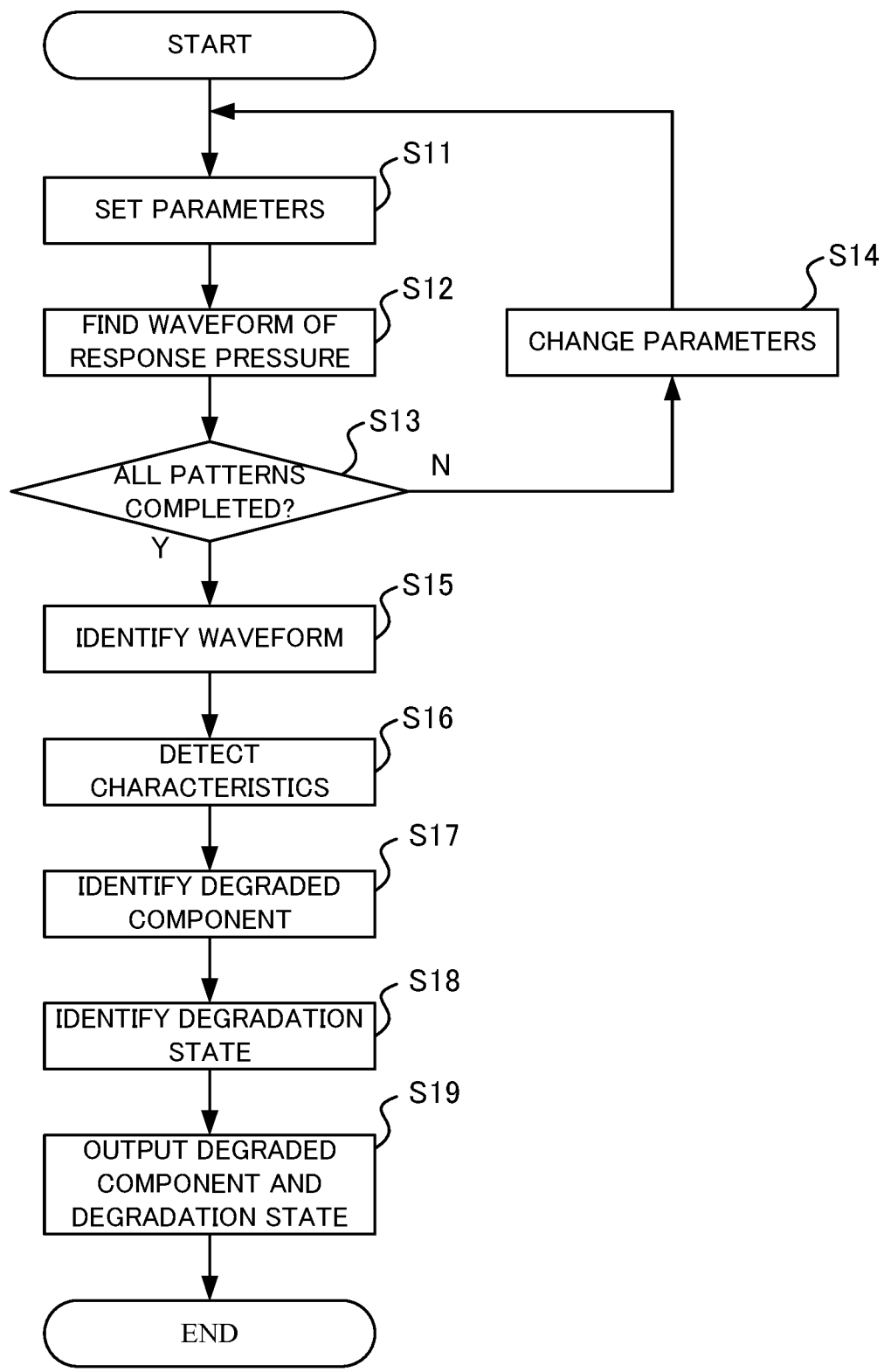
FIG. 6 is a flow chart illustrating one example of an operation of the degradation detection system according to Embodiment 1 that performs degradation detection processing.

The outline of the operation of the degradation detection system 1 is described that identifies the degraded component of the pressure regulating valve 22 that operates as described above. A case in which the command pressure increases at a time T1, as illustrated by a solid line in FIG. 5 is described as an example with reference to the flowchart illustrated in FIG. 6. In FIG. 5, the horizontal axis represents time, and the vertical axis represents pressure. When a change of the command pressure is detected at the time T1, the waveform identifier 13 sends parameters to the simulator 12. The simulator 12 sets the parameters acquired from the waveform identifier 13 in the physical model (step S11). The simulator 12 uses, as a waveform of the command pressure, a waveform formed by measured values of the command pressure during a period τ including the time T1. However, in the case of a system in which no measured value of the command pressure is measured using the sensor, a pressure response model (a response with a first-order delay or a dead time) is defined as a physical model, and the response pressure of the conversion valve 21 is calculated from an electrical command and is used as a waveform of the command pressure. Additionally, the simulator 12 calculates the response pressure based on a physical quantity obtained by applying, to the physical model, a measured value of the command pressure during the period τ. Additionally, the simulator 12 obtains, based on the calculated response pressure, a waveform of the calculated response pressure illustrated by a dashed line in FIG. 5 (step S12). The simulator 12 sends the waveform of the calculated response pressure to the waveform identifier 13. The length of the period τ can be determined in accordance with an interval of change in the command value changes based on the electrical command of the pressure regulating valve 22 and responsiveness.

The waveform identifier 13 stores (i) the parameters sent to the simulator 12 and (ii) the waveform of the response pressure calculated based on the parameters acquired from the simulation unit 12, in association with each other. The waveform identifier 13 collects combination patterns of the parameters and stores the combination patterns. During a period during which the simulation is not performed for all of the combination patterns (No in step S13), the waveform identifier 13 and the simulator 12 change the parameters (Step S14) and repeat the above-described processing.

As a result of the above-described processing, when the simulation is completed for all the combination patterns (Yes in step S13), the waveform identifier 13 obtains a plurality of waveforms of the calculated response pressure from the simulator 12. Additionally, the waveform identifier 13 identifies a waveform that is among the plurality of waveforms of the calculated response pressure and that matches the waveform of the response pressure detected by the pressure sensor 4 (step S15). The waveform identifier 13 sends the identified waveform to the characteristic detector 14. Also, the waveform identifier 13 sends, to the degradation identifier 15, the parameters used for obtaining the identified waveform. The characteristic detector 14 detects a characteristic of the waveform as described later (step S16). The degradation identifier 15 identifies a degraded component of the pressure regulating valve 22 based on (i) the parameters acquired from the waveform identifier 13 and (ii) the normal ranges of the parameters (step S17). Specifically, a parameter that is not in a normal range of the parameter is identified, and a component corresponding to the parameter is identified as a degraded component. The degradation identifier 15 further identifies, based on (i) the characteristic detected by the characteristic detector 14 and (ii) a characteristic of the waveform of the response pressure calculated in the normal state, a degradation state of the degraded pressure regulating valve 22, that is, how the component is degraded (step S18). The degradation identifier 15 outputs information indicating the degraded component and the degradation state (step S19).

The operation of the degradation detection system 1 is described in detail. When the change of the command pressure is detected at the time T1, the waveform identifier 13 sends the parameters to the simulator 12. The simulator 12 calculates the response pressure based on the physical quantity obtained by applying, to the physical model, the measured values of the command pressure during the period τ. The physical model expresses, by the mathematical equations, the physical quantities of the components of the above-described pressure regulating valve 22 based on the parameters. The physical quantities of the components include positions of the components and pressure of the fluid inside the components. Specifically, the physical model expresses, by the mathematical equations, a position of the piston 24 and pressure of the fluid inside the housing 23 based on the parameters. The position L of the piston 24 is expressed by the following equation (1). In the following equation (1), a function F1 is used as a physical model, and a command pressure PI and parameters p1, p2, . . . , pm of the components of the pressure regulating valve 22 are used as variables of the function F1. A normal range is assumed to be set for each of the parameters p1, p2, . . . , pm.

$$L=F1(PI,p1,p2,\ldots,pm) \quad (1)$$

Also, an internal pressure Pa of the control chamber 26 and an internal pressure Pb of the output chamber 27 are used as the internal pressure of the housing 23. The internal pressure Pa is expressed by the following equation (2). In the following equation (2), a function F2 is used as a physical model, and the position L of the piston 24 and the command pressure PI are used as variables of the function F2. Also, the internal pressure Pb is expressed by the following equation (3). In the following equation (3), a function F3 is used as a physical model, and the position L of the piston 24 and the pressure PS of the fluid supplied from the fluid source 3 are used as variables of the function F3.

$$Pa=F2(L,PI) \quad (2)$$

$$Pb=F3(L,PS) \quad (3)$$

Figure 7:
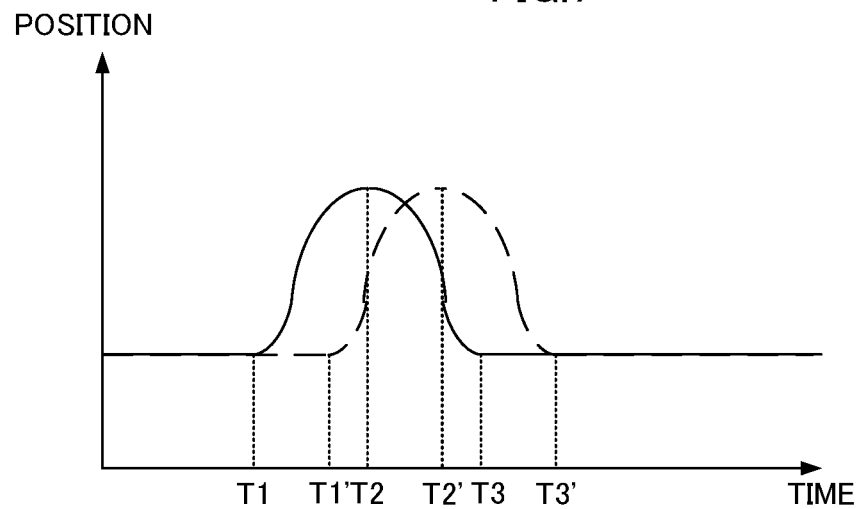
FIG. 7 is a graph illustrating an example of a position of a piston according to Embodiment 1.

The parameters in the above-described equation (1) include the friction coefficient μ of the contact surface between the valve body 25 and the housing 23. The simulator 12 calculates the position of the piston 24 based on the command pressure PI and parameters including the friction coefficient μ. When the internal pressure of the control chamber 26 changes, the position of the piston 24 changes. The friction coefficient μ affects the position of the piston 24 when the piston 24 moves in the first direction. FIG. 7 illustrates the position of the piston 24 when the command pressure increases as illustrated in FIG. 5. The position of the valve body 25-side end surface of the piston 24 is used as the position of the piston 24. In FIG. 7, the horizontal axis represents time, and the vertical axis represents a value indicating the position of the piston 24. When the piston 24 moves in the first direction, the value indicating the position of the piston in FIG. 7 is assumed to increase.

As described above, the simulator 12 calculates the position of the piston 24. The waveform at the position of the piston 24 calculated by the simulator 12 varies depending on the parameters sent from the waveform identifier 13 to the simulator 12. The position of the piston 24 calculated by the simulator 12 when all the parameters are the central values of the normal ranges, that is, when the pressure regulating valve 22 is in a normal state, is indicated by a solid line in FIG. 7. In the normal states, the piston 24 starts to move in the first direction at the time T1. Thereafter, the piston 24 starts to move in the second direction at a time T2. At time T3, the piston 24 returns to the position of the piston 24 located at the time T1.

The position of the piston 24 calculated by the simulator 12 when the friction coefficient μ is not in the normal range, that is, when the valve body 25 is degraded, is represented by a broken line in FIG. 7. A case is described as an example in which the valve body 25 and the housing 23 stick to each other and the friction coefficient μ increases above a rated value. When the valve body 25 is degraded, the piston 24 starts to move in the first direction at the time T1. Thereafter, the piston 24 starts to move in the second direction at a time T2 '. At a time T3', the piston 24 returns to the same position as at a time T1'.

The simulator 12 calculates a change in the position of the piston 24 based on a balance of forces applied to the movable portion 25a. The pressure of the fluid in the supply chamber 28 is denoted by a symbol Pc, the area of a piston 24-side surface 25d of the movable portion 25a is denoted by a symbol S1, and the area of a surface 25e opposite to the surface 25d is denoted by a symbol S2. Also, a pressing force Fp of the piston 24 generated by the command pressure and an elastic force Fs toward the piston 24 by the elastic member 25c are assumed to be applied to the movable portion 25a.

In the normal state, a force expressed by Pb·S1+Fp is applied to the movable portion 25a in the first direction. Also, a force expressed by Pc·S2+Fs is applied to the movable portion 25a in the second direction. Until the time T1, the relationship between the forces applied to the movable portion 25a of the valve body 25 is expressed by the following equation (4), and the piston 24 does not move from the state illustrated in FIG. 2.

$$Pc\cdot S2+Fs>Pb\cdot S1+Fp \quad (4)$$

When the above equation (4) does not hold at the time T1 due to an increase in the pressing force Fp with an increase in the command pressure, the piston 24 starts to move in the first direction. When the piston 24 moves in the first direction, the fluid flows from the supply chamber 28 into the output chamber 27, and the internal pressure Pb of the output chamber 27 increases. During a period from the time T1 to the time T2, the relationship between the forces applied to the movable portion 25a of the valve body 25 is expressed by the following equation (5).

$$Pc\cdot S2+Fs<Pb\cdot S1+Fp \quad (5)$$

When the internal pressure Pa of the control chamber 26 and the internal pressure Pb of the output chamber 27 balance each other with the increase of the internal pressure Pb of the output chamber 27, the pressing force Fp decreases. As a result, when the above equation (5) does not hold, the piston 24 moves in the second direction. After the time T2, the relationship between the forces applied to the movable portion 25a of the valve body 25 is expressed by the above equation (4). The simulator 12 calculates the position of the piston 24 based on the change in the forces applied to the above-described movable portion 25a.

Even when the valve body 25 is degraded, the force applied to the movable portion 25a in the first direction is similar to that in the normal state. That is, the force expressed by Pb·S1+Fp is applied to the movable portion 25a in the first direction. In a state in which the valve body 25 is degraded and the valve body 25 and the housing 23 stick to each other, a force that is applied to the movable portion 25a and prevents the valve body 25 from moving away from the housing 23, that is, a force Fstk that is applied to the movable portion 25a in the second direction is assumed to be generated. That is, the force expressed by Pc·S2+Fs+Fstk is applied to the movable portion 25a in the second direction. A value of the force Fstk depends on the friction coefficient included in the parameters. Until the time T1', the relationship between the forces applied to the movable portion 25a of the valve body 25 is expressed by the following equation (6), and the piston 24 does not move from the state illustrated in FIG. 2. Since the force Fstk is added to the left side of the following equation (6), the following equation (6) holds until the time T1' even after the command pressure starts to increase at the time T1.

$$Pc \cdot S2 + Fs + \text{Fstk} > Pb \cdot S1 + Fp \quad (6)$$

The above equation (6) does not hold at the time T1', and the piston 24 starts to move in the first direction. When the piston 24 moves in the first direction, the fluid flows from the supply chamber 28 into the output chamber 27, and the pressure Pb of the output chamber 27 increases. During a period from time T1' to the time T2', the relationship between the forces applied to the movable portion 25a of the valve body 25 is expressed by the following equation (7).

$$Pc \cdot S2 + Fs + \text{Fstk} < Pb \cdot S1 + Fp \quad (7)$$

When the internal pressure of the control chamber 26 and the internal pressure Pa of the output chamber 27 balance with each other with an increase in the internal pressure Pb of the output chamber 27, the pressing force Fp decreases. As a result, when the above equation (7) does not hold, the piston 24 moves in the second direction. On and after the time T2', the relationship between the forces applied to the movable portion 25a of the valve body 25 is expressed by the above equation (6). The simulator 12 calculates the position of the piston 24 based on the forces applied to the above-described movable portion 25a in consideration of the parameters.

Figure 8:
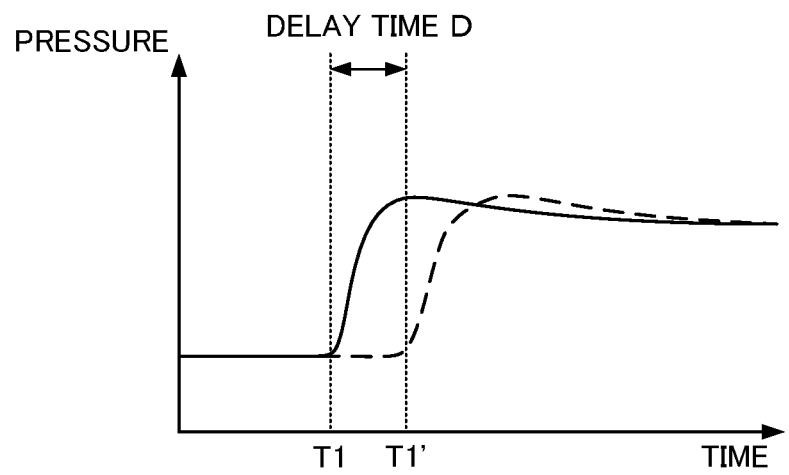
FIG. 8 is a graph illustrating a waveform characteristic of the response pressure in Embodiment 1.

The simulator 12 calculates the position of the piston 24 from the measured values of the command pressure during the period τ as described above. Depending on the position of the piston 24, the simulator 12 calculates the response pressure by calculating (i) an amount of the fluid flowing from the supply chamber 28 into the output chamber 27 or (ii) an amount of the fluid discharged from the output chamber 27. As a result, the simulator 12 can obtain the waveform of the calculated response pressure. In FIG. 8, the waveform of the calculated response pressure in the normal state is indicated by a solid line, and the waveform of the calculated response pressure in the case in which the valve body 25 and the housing 23 stick to each other is indicated by a broken line. As described above, since the change in the position of the piston 24 depends on the friction coefficient μ, when the valve body 25 and the housing 23 stick to each other due to degradation of the valve body 25 and the friction coefficient μ increases, a period from when the command pressure increases to when the piston 24 starts to move becomes long. As a result, a period from when the command pressure increases to when the response pressure begins to increase becomes long. In other words, the waveform of the response pressure calculated under a condition that the valve body 25 and the housing 23 stick to each other is delayed by a delay time D as compared with the waveform in the normal state.

The waveform identifier 13 identifies, from among the plurality of waveforms of the calculated response pressure acquired from the simulator 12, a waveform that matches the waveform of the detected response pressure. Specifically, the waveform identifier 13 repeatedly performs, at a constant time interval, a process in which the waveform identifier 13 (i) compares pressure indicated by the waveform of the detected response pressure with pressure indicated by the waveform of the calculated response pressure and (ii) determines whether the absolute value of a pressure difference is equal to or less than a first threshold. By setting the first threshold to be a sufficiently small value, the pressure indicated by the waveform of the detected response pressure can be regarded as equal to the pressure indicated by the waveform of the calculated response pressure. When the proportion of determination results in which the absolute value of the pressure difference is equal to or less than the first threshold to N determination results in the period τ is equal to or greater than a second threshold, the waveform identifier 13 regards the waveform of the detected response pressure as matching the waveform of the calculated response pressure. A value of the number N is determined in accordance with an accuracy required for the waveform identifier 13. The first threshold and the second threshold can be determined in accordance with the accuracy required for the waveform identifier 13. The waveform identifier 13 sends, to the degradation identifier 15, a parameter value corresponding to the identified waveform. The waveform identifier 13 can use a freely-selected method such as a least-squares method or a minimax method when comparing the above-described waveforms.

The measured values of the response pressure in a state in which the components of the pressure regulating valve 22 are degraded are different from the measured values of the response pressure in a normal state. Accordingly, the characteristic detector 14 (i) detects characteristics of the waveform of the calculated response pressure that is identified by the waveform identifier 13 and (ii) sends the detected characteristics to the degradation identifier 15. The characteristics include at least one of delay time, slope, and presence or absence of vibration. The degradation identifier 15 identifies the degraded component of the pressure regulating valve 22 based on (i) the values of the parameters that are acquired from the waveform identifier 13 and the normal ranges of the parameters and (ii) the characteristics acquired from the characteristic detector 14. Specifically, when the value of the parameter is not in the normal range, the degradation identifier 15 identifies, as a degraded component, a component of the pressure regulating valve 22 corresponding to the parameter.

Also, the degradation identifier 15 identifies a degradation state of the degraded pressure regulating valve 22 based on the characteristics of the waveform of the calculated response pressure. The degradation identifier 15 is assumed to associate the changes in the characteristics with information about how the component of the pressure regulating valve 22 is degraded. When the characteristics of the waveform of the calculated response pressure are different from the characteristics of the waveform of the calculated response pressure in the normal state, the degradation identifier 15 identifies, based on the changes in the characteristics and the above-described association, how the degraded component of the pressure regulating valve 22 is degraded.

Details of processing in which the degradation identifier 15 identifies how the degraded pressure regulating valve 22 is degraded are described. A case in which a delay time is used as a characteristic is described as an example. As described above, when the valve body 25 and the housing 23 stick to each other due to degradation of the valve body 25 and the friction coefficient μ increases, a period from a time when the command pressure increases to a time when the response pressure starts to increase becomes long. Accordingly, the degradation identifier 15 uses, as a characteristic of the waveform of the calculated response pressure, a delay time relative to the waveform of the response pressure in the normal state. The degradation identifier 15 is assumed to associate an increase in delay time with the sticking of the valve body to the housing. The degradation identifier 15 (i) identifies, from the delay time, that the valve body 25 is degraded and (ii) further identifies that the valve body 25 and the housing 23 stick to each other. Specifically, the degradation identifier 15 identifies that the valve body 25 and the housing 23 stick to each other when the delay time is equal to or greater than a third threshold. The third threshold is determined in accordance with responsiveness of the pressure regulating valve 22.

The characteristic detector 14 uses, as the waveform of the calculated response pressure in the normal state, a waveform of the calculated response pressure in a case in which all the parameters of the physical model are the central values of the respective normal ranges. As illustrated in FIG. 8, a period from the time T1 when the calculated response pressure in the normal state starts to change to the time T1' when the response pressure indicated by the waveform identified by the waveform identifier 13 starts to change is used as a delay time D. When the valve body 25 sticks to the housing 23 due to the degradation of the valve body 25, the start of the change in the response pressure is later than in the normal state, thereby causing the delay time D. Accordingly, the degradation identifier 15 can identify, from the delay time D detected by the characteristic detector 14, the sticking of the valve body 25 to the housing 23 due to the degradation of the valve body 25.

Figure 9:
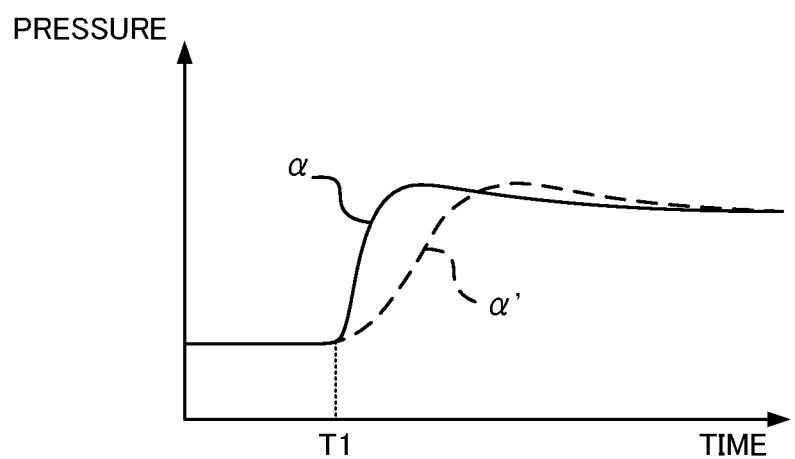
FIG. 9 is a graph illustrating a waveform characteristic of the response pressure in Embodiment 1.

As described above, the characteristics include at least one of the delay time of the waveform, the slope of the waveform, or presence or absence of vibration in the waveform. Therefore, a process of identifying a degraded component of the pressure regulating valve 22 using, as a characteristic, the slope of the waveform of the calculated response pressure is described. The waveform of the calculated response pressure in the normal state is illustrated by a solid line in FIG. 9. FIG. 9 is annotated in the same manner as FIG. 5. When the surface 25d of the valve body 25 is made of rubber and the rubber is degraded, the friction coefficient between the valve body 25 and the housing 23 may increase. The waveform of the response pressure in a state in which the valve body 25 is degraded is illustrated by a broken line in FIG. 9. When the friction coefficient between the valve body 25 and the housing 23 increases, the moving speed of the piston 24 becomes slow due to the friction between the valve body 25 and the housing 23. That is, a period required for the piston 24 to move from the position illustrated in FIG. 2 to the position illustrated in FIG. 3 becomes longer. In other words, as illustrated in FIG. 9, the friction coefficient between the valve body 25 and the housing 23 increases, and thus the slope a' of the waveform of the response pressure becomes gentler than the slope a in the normal state.

Therefore, the degradation identifier 15 is assumed to associate a decrease in the slope of the waveform with an increase in the friction coefficient between the valve body 25 and the housing 23. The degradation identifier 15 can identify, from the slope detected by the characteristic detector 14, the increase in the friction coefficient between the valve body 25 and the housing 23 due to the degradation of the valve body 25. Specifically, when the slope detected by the characteristic detector 14 is equal to or less than a value obtained by multiplying the slope a in the normal state by a positive number less than 1, the degradation identifier 15 identifies that the friction coefficient between the valve body 25 and the housing 23 increases due to the degradation of the valve body 25.

Figure 10:
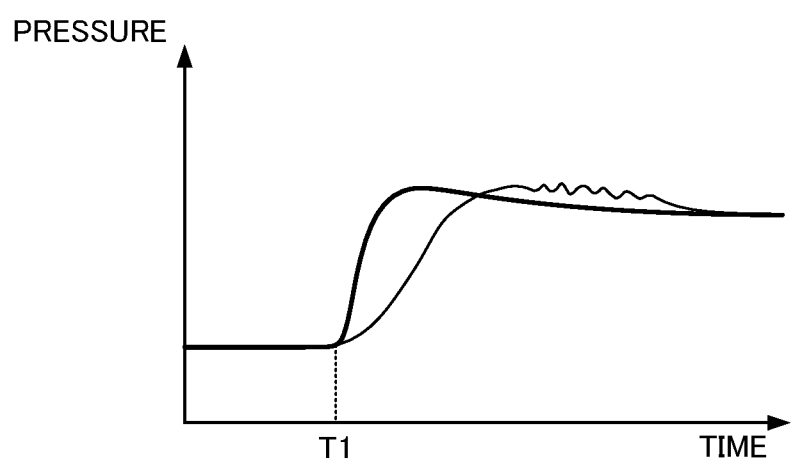
FIG. 10 is a graph illustrating a waveform characteristic of the response pressure in Embodiment 1.

Also, a case in which the presence or absence of vibration in the waveform is used as a characteristic is described. The waveform of the calculated response pressure in the normal state is illustrated by a thick solid line in FIG. 10. FIG. 10 is annotated in the same manner as FIG. 5. The degradation of the valve body 25 may cause a gap between the valve body 25 and the housing 23 in a state in which the valve body 25 and the housing 23 are in contact with each other. Similarly, a gap between the valve body 25 and the piston 24 may occur in a state in which the valve body 25 and the piston 24 are in contact with each other. The waveform of the response pressure is illustrated by a thin solid line in FIG. 10. As illustrated in FIG. 10, vibration may occur in the waveform of the response pressure due to the occurrence of the gap.

Therefore, the degradation identifier 15 is assumed to associate the occurrence of vibration in the waveform with the occurrence of the gap between the valve body 25 and the housing 23 or the piston 24. The degradation identifier 15 can identify, from the presence or absence of the vibration in the waveform, that there is a gap between the valve body 25 and the housing 23 or the piston 24. Specifically, when there is a vibration in the waveform, the degradation identifier 15 identifies that there is the gap between the valve body 25 and the housing 23 or the piston 24.

In the above-described example, the degradation detection process of the degradation detection system 1 is described for the case in which the command pressure increases, although the degradation detection process is similar when the command pressure decreases. When the command pressure decreases, the piston 24 moves from the position illustrated in FIG. 2 in the second direction, and the pressure Pa of the output chamber 27 decreases. Thereafter, the piston 24 moves in the first direction and returns to the position illustrated in FIG. 2.

As described above, according to the degradation detection system 1 according to Embodiment 1, a degraded component of the pressure regulating valve 22 can be identified from the parameters of the physical model. Furthermore, the degradation detection system 1 can identify, from the characteristics of the waveform of the calculated response pressure, how the component is degraded.

Embodiment 2

Figure 11:
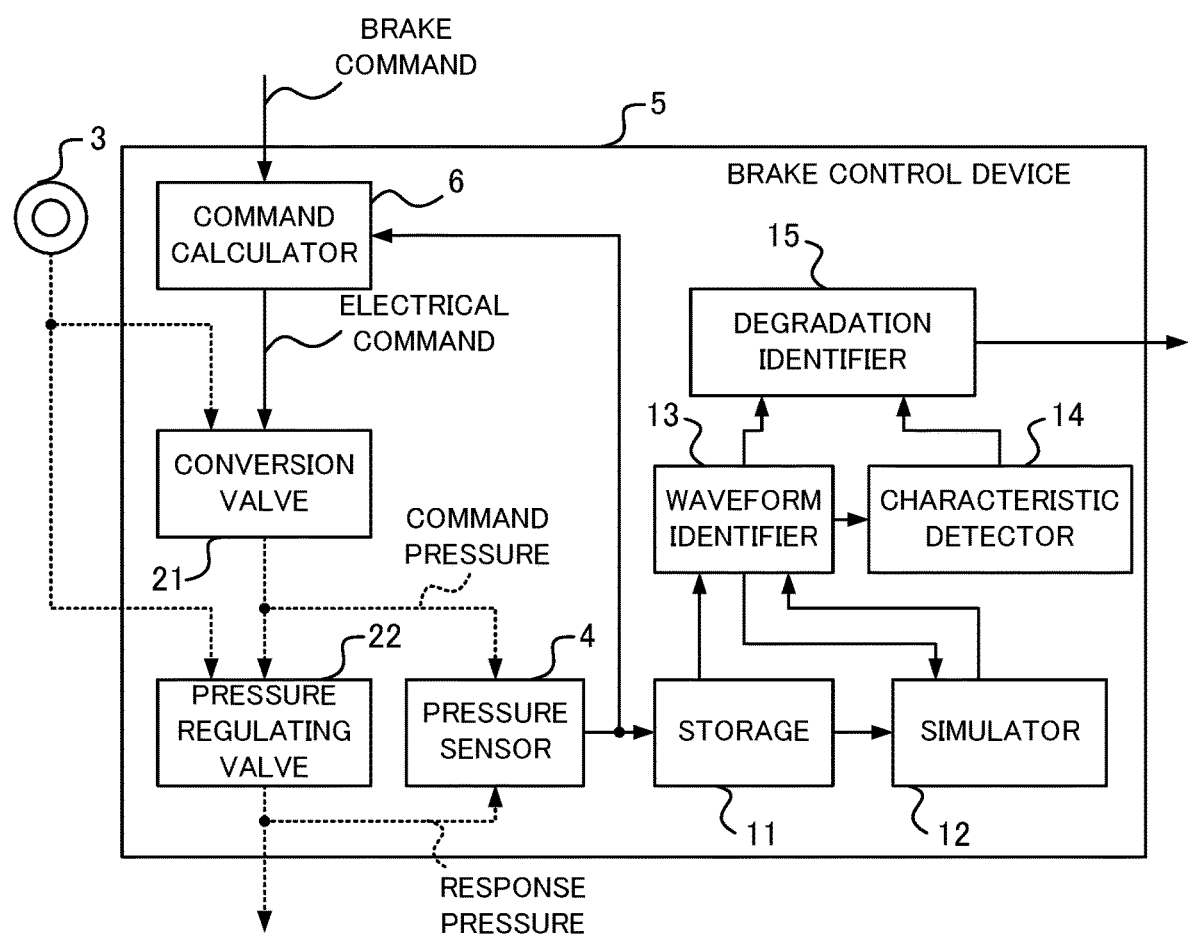
FIG. 11 is a block diagram illustrating a configuration of a brake control device according to Embodiment 2 of the present disclosure.

In Embodiment 1, although the degradation detection system 1 is provided as a system independent of the pressure control device 2, the pressure control device 2 may be configured to have the functions of the degradation detection system 1. In Embodiment 2, as illustrated in FIG. 11, a brake control device 5, which is an example of the pressure control device 2, is mounted on a railway vehicle and includes components of the degradation detection system 1. Specifically, the brake control device 5 includes a command calculator 6 that (i) acquires a brake command from a master controller provided in a cab and (ii) outputs, to the pressure regulating valve 22, an electrical command corresponding to the brake command. The brake control device 5 further includes the conversion valve 21, the pressure regulating valve 22, and the pressure sensor 4. The brake control device 5 further includes the components of the degradation detection system 1 according to Embodiment 1, that is, the storage 11, the simulator 12, the waveform identifier 13, the characteristic detector 14, and the degradation identifier 15. The structures and operations of the components of the brake control device 5 other than the command calculator 6 are the similar to those of Embodiment 1. The command calculator 6 adjusts the electrical command in accordance with the output pressure of the pressure regulating valve 22 detected by the pressure sensor 4.

As described above, according to the brake control device 5 according to Embodiment 2, a degraded component of the pressure regulating valve 22 can be identified from the parameters of the physical model. Furthermore, the brake control device 5 can identify, from the characteristics of the waveform of the calculated response pressure, how the component is degraded. Since the brake control device 5 is made to have a function of identifying the degraded component of the pressure regulating valve 22, there is no need to provide the degradation detection system 1 separately from the brake control device 5.

Embodiment 3

Figure 12:
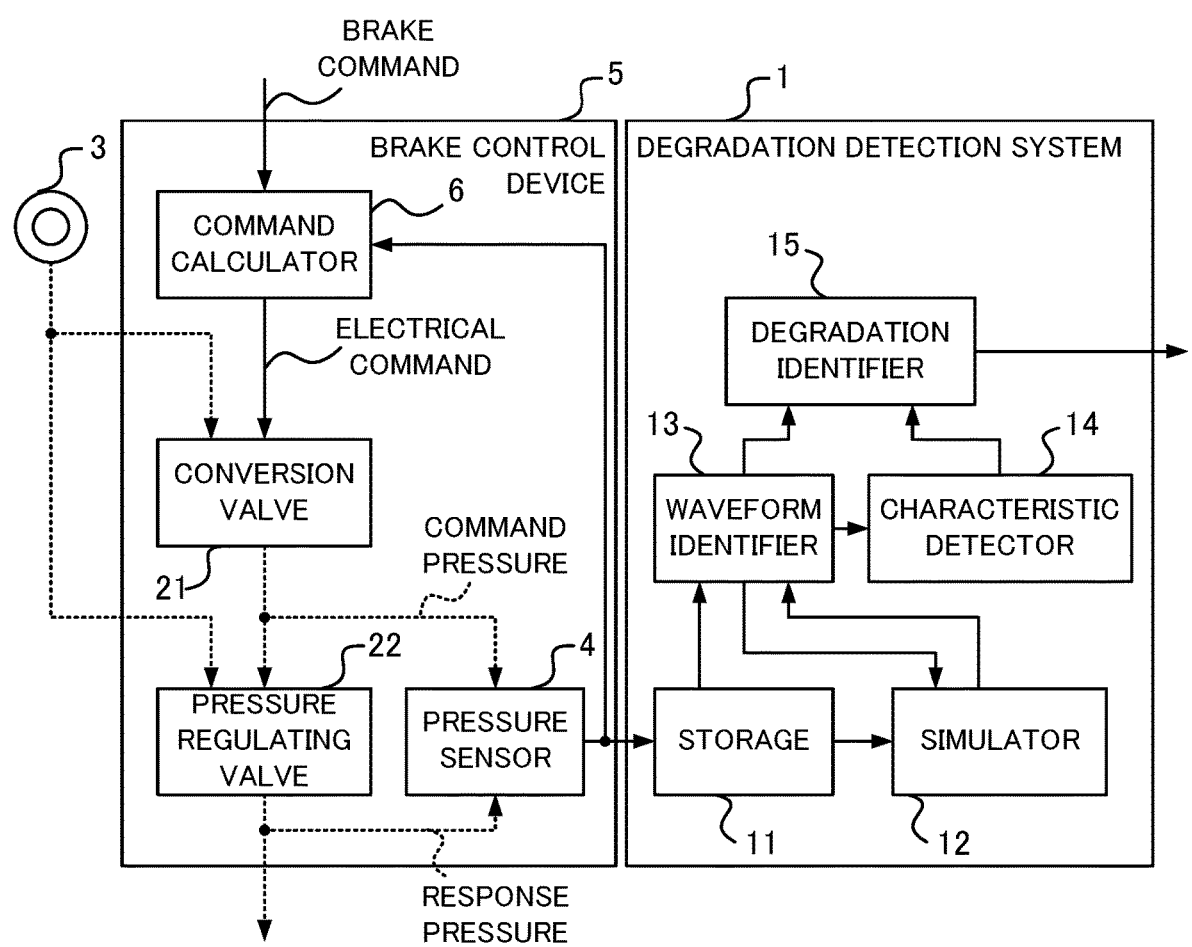
FIG. 12 is a block diagram illustrating a configuration of a degradation detection system according to Embodiment 3 of the present disclosure.

In Embodiment 2, although the brake control device 5 has a function of identifying a degraded component of the pressure regulating valve 22, similarly to Embodiment 1, the degradation detection system 1 can be arranged independently from the control device 5. As illustrated in FIG. 12, the degradation detection system 1 that identifies a degraded component among the components of the pressure regulating valve 22 included in the brake control device 5 is provided. Since the degradation detection system 1 is provided independently of the brake control device 5, there is no need to mount the degradation detection system 1 on the railway vehicle. Accordingly, there is no restriction on the location of arrangement of the degradation detection system 1, and the degradation detection system 1 can be arranged separately from the rail vehicle.

As described above, according to the degradation detection system 1 according to Embodiment 3, a degraded component, among the components of the pressure regulating valve 22 included in the brake control device 5, can be identified from the parameters of the physical model. Furthermore, the degradation detection system 1 can identify, from the characteristics of the waveform of the calculated response pressure, how the component is degraded.

Embodiment 4

Figure 13:
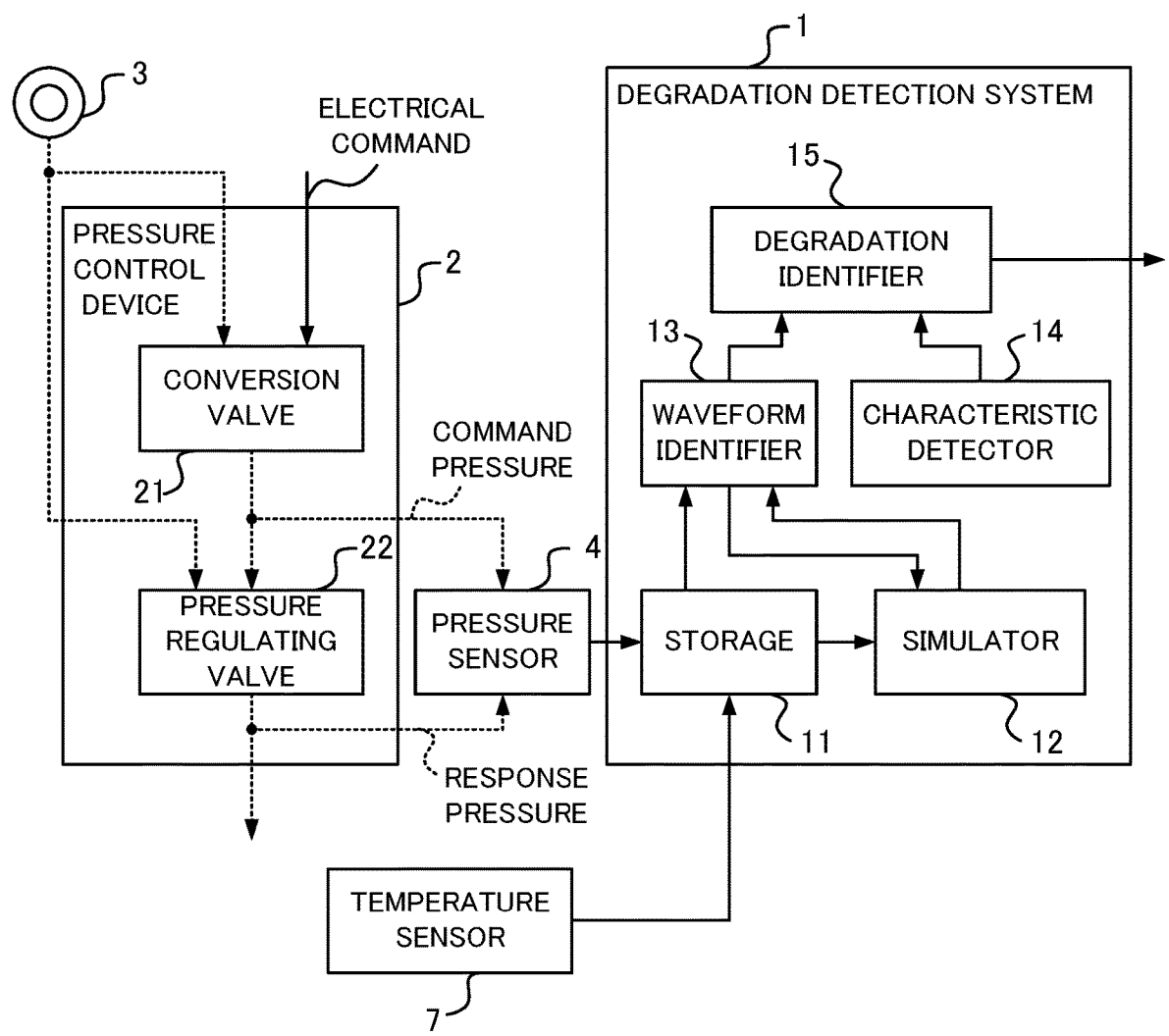
FIG. 13 is a block diagram illustrating a configuration of a degradation detection system according to Embodiment 4 of the present disclosure.

In Embodiments 1 to 3, the physical model expresses, based on the parameters, the physical quantities of the components by mathematical equations. The physical quantities of the components may depend on temperatures of the components. Accordingly, in Embodiment 4, the physical model expresses, based on the parameters and the temperatures of the components, the physical quantities of the components by mathematical equations. As illustrated in FIG. 13, the storage 11 (i) acquires a sensor signal from not only the pressure sensor 4 but also a temperature sensor 7 attached to the inside of the housing 23 of the pressure regulating valve 22 and (ii) stores a temperature of a component indicated by the sensor signal. The storage 11 stores a measured value of the command pressure and a measured value of the response pressure in association with the temperature of the component. A temperature detected by the temperature sensor 7 attached to the inside of the housing 23 of the pressure regulating valve 22 is set to be a temperature of each component of the pressure regulating valve 22.

The simulator 12 calculates the response pressure based on the measured values of the command pressure and the temperature associated with the measured values of the command pressure. The friction coefficient μ of the contact surface between the valve body 25 and the housing 23 increases as the valve body 25 degrades. The friction coefficient μ decreases with a decrease in the temperature. That is, even when the valve body 25 is degraded, the valve body 25 and the housing 23 are less likely to stick to each other with the decrease in the temperature. The simulator 12 (i) calculates the position of the piston 24 based on the friction coefficient μ that varies in accordance with the temperature and (ii) obtains a waveform of the calculated response pressure. By obtaining the waveform of the response pressure calculated in accordance with the temperature, the accuracy of the waveform identifier 13 is improved, and as a result, the accuracy of the degradation detection of the degradation detection system 1 is improved.

As described above, according to the degradation detection system 1 according to Embodiment 4, since a waveform of the calculated response pressure is found while taking into account the temperature, the accuracy of the degradation detection can be improved.

Embodiment 5

Figure 14:
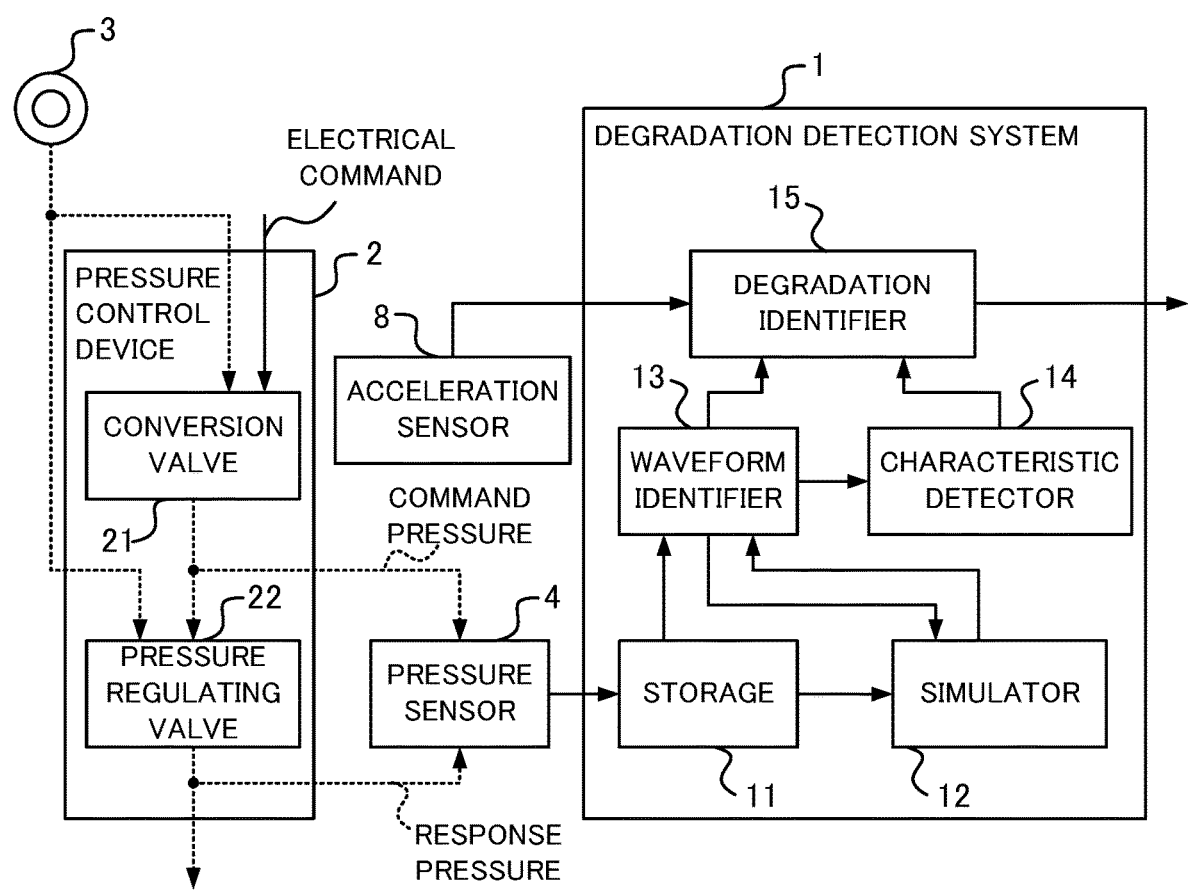
FIG. 14 is a block diagram illustrating a configuration of a degradation detection system according to Embodiment 5 of the present disclosure.

The degradation detection system 1 may be configured to not only identify a degraded component of the pressure regulating valve 22 based on the parameters, the normal ranges of the parameters, and the characteristics of the waveforms but also detect the deterioration of the whole of the pressure control device 2. In Embodiment 5, as illustrated in FIG. 14, the degradation detection system 1 detects degradation of the pressure control device 2 based on a sensor signal from an acceleration sensor 8. The acceleration sensor 8 is attached to the pressure control device 2, and the magnitude of shaking of the whole of the pressure control device 2 can be detected from the sensor signal output by the acceleration sensor 8. The degradation identifier 15 detects the deterioration of the whole of the pressure control device 2 when an amplitude of the sensor signal is equal to or greater than a threshold. The threshold is determined in accordance with the characteristics of the pressure control device 2, an installation location of the pressure control device 2, or the like.

As described above, according to the degradation detection system 1 according to Embodiment 5, the deterioration of the whole of the pressure control device 2 can be detected based on the vibration of the pressure control device 2.

Figure 15:
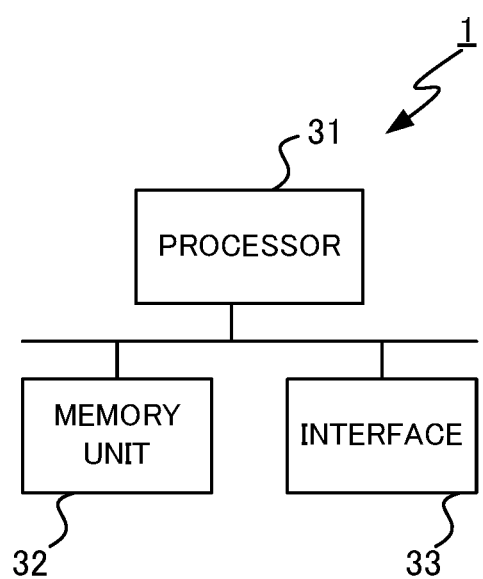
FIG. 15 is a diagram illustrating an example of a hardware configuration of the degradation detection systems according to the embodiments.

FIG. 15 is a diagram illustrating an example of a hardware configuration of the degradation detection systems according to the embodiments. The degradation detection system 1 includes, as a hardware configuration for controlling each component, a processor 31, a memory unit 32, and an interface 33. Each of functions of these devices is realized by the processor 31 executing a program stored in the memory unit 32. The interface 33 is a component for connecting the respective devices and establishing communication, and as may be required, may be configured as multiple types of interfaces. Although FIG. 15 illustrates an example in which the single processor 31 and the single memory unit 32 are provided, a plurality of the processors 31 and a plurality of the memories 32 may be used to execute each of the functions cooperatively.

In addition, the above-described hardware configuration and flowchart are merely examples and can be freely changed and modified.

The central portion that includes the processor 31, the memory unit 32, and the interface 33 to perform control processing can be achieved using a normal computer system without using a dedicated system. For example, the degradation detection system 1 may be configured to execute the above-described processes by (i) storing, on a computer readable recording medium (a flexible disc, a compact disc-read only memory (CD-ROM), digital versatile disc-read only memory (DVD-ROM) or the like), a computer program for executing the above-described processes, (ii) distributing the medium, and (iii) installing the computer program in a computer. Alternatively, the degradation detection system 1 may be configured by (i) storing the computer program in a storage device that is included in a server device on a communication network and (ii) downloading the computer program onto a normal computer system.

Also, in a case in which an operating system (OS) and an application program share with each other in realizing the functions of the degradation detection system 1 or the functions of the degradation detection system 1 are realized by cooperation between the OS and the application program, storage of the application program alone on the recording medium or the storage device is permissible.

Also, the computer program may be distributed via a communication network by superimposing the computer program on a carrier wave. For example, the computer program may be posted on a bulletin board system (BBS) on a communication network, and the computer program may be distributed via the communication network. Additionally, the computer program may be launched and executed under the control of the OS in the same manner as other application programs so that the above-described processes can be executed.

Embodiments of the present disclosure are not limited to the above-described embodiments. Oil may be used as the fluid. The degradation detection system 1 may identify by the degradation identifier 15 the degraded component from the parameters and the normal ranges of the parameters, without providing of the characteristic detector 14. The degradation detection system 1 may further include a display that displays the degraded component and displays how the component is degraded. The normal ranges used by the degradation identifier 15 may depend on temperature. In this case, the waveform identifier 13 sends, to the degradation identifier 15, not only the parameters but also the temperature stored in the storage 11 in association with measured values of the command pressure. The degradation identifier 15 (i) adjusts the normal ranges according to the temperature and (ii) identifies, based on the parameters and the adjusted normal ranges, the degraded component of the pressure regulating valve 22.

Also, parameters for the present disclosure are not limited to the above-described examples. The parameters in the above-described equation (1) can include the friction coefficient of the contact surface between the piston 24 and the valve body 25. Also, a static friction coefficient and a dynamic friction coefficient can be used as the friction coefficient. Additionally, the parameters can include an amount of unintended outflow of fluid from each of the control chamber 26, the output chamber 27, and the supply chamber 28. Specifically, a parameter indicating the amount of fluid flowing out from the control chamber 26 is included, as a variable of the function F2, in the above-described equation (2). Also, parameters indicating (i) the size of the gap between the valve body 25 and the housing 23 in the state in which the valve body 25 and the housing 23 come into contact with each other and (ii) an amount of the fluid flowing through the gap are included, as a variable of the function F3, in the above-described equation (3). In this case, the simulator 12 calculates the response pressure based on the position of the piston 24, the size of the gap between the valve body 25 and the housing 23, and the amount of fluid flowing through the gap. Also, the parameters can include an elastic coefficient of the elastic member 25c. In this case, the simulator 12 (i) calculates the elastic force Fs in the above-described equations (4) to (7) in accordance with the elastic coefficient of the elastic member 25c and (ii) calculates the position of the piston 24. That is, the parameters of the above-described equation (1) include the elastic coefficient of the elastic member 25c. Additionally, the parameters of the above-described equation (1) can include pressure applied to a component of the pressure regulating valve 22. Specifically, the parameters include pressure applied to the piston 24 in addition to the command pressure PI. In this case, the simulator 12 calculates the position of the piston 24 based on the pressure applied to the component of the pressure regulating valve 22.

The above-described parameters may be set to be direct parameters that directly affect the physical quantities of the components of the pressure regulating valve 22, and an indirect parameter for determining values of the direct parameters may be used. A rigidity value of a rubber member forming the surface 25e can be used as the indirect parameter. In this case, the simulator 12 increases the friction coefficient μ with an increase of the rigidity value of the rubber member. Also, a rigidity value of an O-ring fitted into the valve body 25 may be used as an indirect parameter. In this case, the simulator 12 increases the friction coefficient μ with an increase of the rigidity value of the O-ring. Also, a state of application of grease to the valve body 25 can be used as the indirect parameter. Specifically, an indirect parameter indicating the state of application of grease is defined as a value of 0 or more and 1 or less. The value 0 indicates a state in which no grease is applied to the valve body 25, the value 1 indicates a state in which the grease is sufficiently applied to the valve body 25, and the value of the indirect parameter indicating the state of application of the grease can be determined. In this case, the simulator 12 increases the friction coefficient μ as the parameter indicating the state of application of the grease approaches zero.

As described above, the degradation detection system 1 identifies a degraded component of the pressure regulating valve 22 based on a detection value from the pressure sensor 4. Accordingly, the degradation detection system 1 may be made to have a function for preventing erroneous detection due to abnormality of the pressure sensor 4. Specifically, the degradation identifier 15 (i) determines whether there is an abnormality in the pressure sensor 4 and (ii) identifies a degraded component only when there is no abnormality in the pressure sensor 4. The degradation identifier 15 is assumed to hold a predetermined normal range of the command pressure and a predetermined normal range of the response pressure. Additionally, the degradation identifier 15 acquires, from the storage 11, measured values of the command pressure and measured values of the response pressure, and, in a case in which the measured values of the command pressure are in the normal range and the measured values of the response pressure are in the normal range, that is, in a case in which there is no abnormality in the measured values of the command pressure and in the measured values of the response pressure, the degradation identifier 15 (i) determines that there is no abnormality in the pressure sensor 4 and (ii) identifies the degraded component of the pressure regulating valve 22. The normal range of the command pressure and the normal range of the response pressure may depend on a temperature of the pressure sensor 4. In this case, the temperature of the pressure sensor 4 indicated by a sensor signal output by the temperature sensor attached to the pressure sensor 4 is stored in the storage 11 in association with the measured values of the command pressure and the measured values of the response pressure detected by the pressure sensor 4. The degradation identifier 15 acquires, from the storage 11, the measured values of the command pressure, the measured values of the response pressure, and the temperature of the pressure sensor 4, and, in a case in which the measured values of the command pressure are in the normal range that varies in accordance with the temperature and the measured values of the response pressure are in the normal range that varies in accordance with the temperature, that is, in the case in which there is no abnormality in the measured values of the command pressure and in the measured values of the response pressure, the degradation identifier 15 (i) determines that there is no abnormality in the pressure sensor 4 and (ii) identifies the degraded component of the pressure regulating valve 22.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Degradation detection system
2 Pressure control device
3 Fluid source
4 Pressure sensor
5 Brake control device
6 Command calculator
7 Temperature sensor
8 Acceleration sensor
11 Storage
12 Simulator
13 Waveform identifier
14 Characteristic detector
15 Degradation identifier
21 Conversion valve
22 Pressure regulating valve
23 Housing
24 Piston
25 Valve body
25a Movable portion
25b Fixed portion
25c Elastic member
25d, 25e Surface
26 Control chamber
27 Output chamber
28 Supply chamber
29 Membrane plate
31 Processor
32 Memory unit
33 Interface

The invention claimed is:

1. A degradation detection system for a pressure regulating valve in a pressure control device that includes (i) a conversion valve to adjust a pressure of a fluid supplied from a fluid source based on an electrical command and output the fluid, and (ii) the pressure regulating valve to adjust, in accordance with a pressure of the fluid output by the conversion valve, the pressure of the fluid supplied from the fluid source and output the fluid, the degradation detection system comprising:

a simulator to (i) acquire a command pressure that is the pressure of the fluid output by the conversion valve, (ii) apply the command pressure to a physical model that expresses physical quantities of components of the pressure regulating valve based on a parameter of each of the components of the pressure regulating valve, and (iii) calculate a response pressure that is the pressure of the fluid output by the pressure regulating valve, thereby obtaining a waveform of the calculated response pressure corresponding to a waveform of the command pressure in a case in which the command pressure is changed;

a waveform identifier to acquire a detected response pressure that is a detected value of the response pressure corresponding to the command pressure, and identify (i) a waveform of the calculated response pressure that matches a waveform of the detected response pressure and (ii) the parameter of the physical model used for obtaining the waveform of the response pressure; and a degradation identifier to identify a degraded component among the components of the pressure regulating valve from a value of the parameter, identified by the waveform identifier, of the physical model used for obtaining the waveform.

2. The degradation detection system according to claim 1, further comprising a characteristic detector to detect a characteristic of the waveform of the calculated response pressure identified by the waveform identifier, wherein the degradation identifier identifies a degradation state of the degraded component from the characteristic detected by the characteristic detector and an association between the characteristic and the degradation state, and the characteristic include at least one of a delay time of the waveform, a slope of the waveform, or presence or absence of vibration in the waveform.

3. The degradation detection system according to claim 2, wherein the physical model expresses, by a mathematical equation, the physical quantities of the components based on the parameter and temperatures of the components.

4. The degradation detection system according to claim 2, wherein the degradation identifier acquires a sensor signal from an acceleration sensor attached to the pressure control device and detects degradation of the pressure control device based on the sensor signal.

5. The degradation detection system according to claim 2, wherein using a normal range determined for each of the command pressure and response pressure, the degradation identifier determines, from (i) the command pressure and the normal range of the command pressure, and (ii) the detected response pressure and the normal range of the detected response pressure, whether there is abnormality in the command pressure and in the detected response pressure, and identifies the degraded component only when there is no abnormality in the command pressure or in the detected response pressure.

6. The degradation detection system according to claim 5, wherein the normal range of the command pressure and the normal range of the response pressure vary in accordance with a temperature of a pressure sensor that detects the command pressure and the response pressure, the degradation identifier
    determines, from (i) the command pressure and the normal range of the command pressure varying in accordance with the temperature of the pressure sensor, and (ii) the detected response pressure and the normal range of the detected response pressure varying in accordance with the temperature of the pressure sensor, whether there is abnormality in the command pressure and in the detected response pressure, and
    identifies the degraded component only when there is no abnormality in the command pressure or in the detected response pressure.

7. The degradation detection system according to claim 2, wherein
the pressure regulating valve comprises:
    a housing;
    a piston to reciprocate inside the housing in accordance with the command pressure; and
    a valve body to change a shape thereof in accordance with a movement of the piston,
by changing the shape of the valve body in accordance with the movement of the piston, a piston-side surface of the valve body reciprocates between a position at which the piston-side surface comes into contact with the housing and a position away from the housing, and
the physical model expresses, by a mathematical equation, a position of the piston and a pressure of fluid inside the housing.

8. The degradation detection system according to claim 7, wherein
the parameter includes a friction coefficient of a contact surface between the valve body and the housing, and
the physical model expresses, based on a force hindering the valve body from moving away from the housing in accordance with the friction coefficient, the position of the piston by a mathematical equation.

9. The degradation detection system according to claim 7, wherein
the parameter includes an amount of the fluid flowing through a gap between the valve body and the housing in a state in which the valve body and the housing come into contact with each other, and
the physical model expresses, based on the amount of the fluid flowing through the gap, the pressure of the fluid inside the housing by a mathematical equation.

10. The degradation detection system according to claim 1, wherein
the physical model expresses, by a mathematical equation, the physical quantities of the components based on the parameter and temperatures of the components.

11. The degradation detection system according to claim 1, wherein
the degradation identifier acquires a sensor signal from an acceleration sensor attached to the pressure control device and detects degradation of the pressure control device based on the sensor signal.

12. The degradation detection system according to claim 1, wherein
using a normal range determined for each of the command pressure and response pressure, the degradation identifier
    determines, from (i) the command pressure and the normal range of the command pressure, and (ii) the detected response pressure and the normal range of the detected response pressure, whether there is abnormality in the command pressure and in the detected response pressure, and
    identifies the degraded component only when there is no abnormality in the command pressure or in the detected response pressure.

13. The degradation detection system according to claim 12, wherein
the normal range of the command pressure and the normal range of the response pressure vary in accordance with a temperature of a pressure sensor that detects the command pressure and the response pressure,
the degradation identifier
    determines, from (i) the command pressure and the normal range of the command pressure varying in accordance with the temperature of the pressure sensor, and (ii) the detected response pressure and the normal range of the detected response pressure varying in accordance with the temperature of the pressure sensor, whether there is abnormality in the command pressure and in the detected response pressure, and
    identifies the degraded component only when there is no abnormality in the command pressure or in the detected response pressure.

14. The degradation detection system according to claim 1, wherein
the pressure regulating valve comprises:
    a housing;
    a piston to reciprocate inside the housing in accordance with the command pressure; and
    a valve body to change a shape thereof in accordance with a movement of the piston,
by changing the shape of the valve body in accordance with the movement of the piston, a piston-side surface of the valve body reciprocates between a position at which the piston-side surface comes into contact with the housing and a position away from the housing, and
the physical model expresses, by a mathematical equation, a position of the piston and a pressure of fluid inside the housing.

15. The degradation detection system according to claim 14, wherein
the parameter includes a friction coefficient of a contact surface between the valve body and the housing, and
the physical model expresses, based on a force hindering the valve body from moving away from the housing in accordance with the friction coefficient, the position of the piston by a mathematical equation.

16. The degradation detection system according to claim 14, wherein
the parameter includes an amount of the fluid flowing through a gap between the valve body and the housing in a state in which the valve body and the housing come into contact with each other, and
the physical model expresses, based on the amount of the fluid flowing through the gap, the pressure of the fluid inside the housing by a mathematical equation.

17. The degradation detection system according to claim 14, wherein
the pressure regulating valve comprises an elastic member that urges a surface of the valve body facing the piston to move toward the piston,
the parameter includes an elastic coefficient of the elastic member, and the physical model expresses, based on a force in a direction toward the piston in accordance with the elastic coefficient, the position of the piston by a mathematical equation.

18. The degradation detection system according to claim 14, wherein
the parameter includes a pressure applied to the component, and
the physical model expresses, based on the pressure applied to the component, the position of the piston by a mathematical equation.

19. A brake control device, comprising:
a command calculator to calculate a braking force in accordance with a brake command and output an electrical command in accordance with the braking force;
a conversion valve to adjust a pressure of a fluid supplied from a fluid source in accordance with the electrical command and output the fluid;
a pressure regulating valve to adjust, in accordance with a pressure of the fluid output by the conversion valve, the pressure of the fluid supplied from the fluid source and output the fluid;
a simulator to (i) acquire a command pressure that is the pressure of the fluid output by the conversion valve, (ii) apply the command pressure to a physical model that expresses physical quantities of components of the pressure regulating valve based on a parameter of the components of the pressure regulating valve, and (iii) calculate a response pressure that is the pressure of the fluid output by the pressure regulating valve, thereby obtaining a waveform of the calculated response pressure corresponding to a waveform of the command pressure in a case in which the command pressure is changed;
a waveform identifier to
acquire a detected response pressure that is a detected value of the response pressure corresponding to the command pressure, and
identify a waveform of the calculated response pressure that matches a waveform of the detected response pressure; and
a degradation identifier to identify a degraded component among the components of the pressure regulating valve from a value of the parameter, identified by the waveform, of the physical model used for obtaining the waveform.

20. A degradation detection method for a pressure regulating valve in a pressure control device that includes (i) a conversion valve to adjust a pressure of a fluid supplied from a fluid source and output the fluid, and (ii) the pressure regulating valve to adjust, in accordance with a pressure of the fluid output by the conversion valve, the pressure of the fluid supplied from the fluid source and output the fluid, the degradation detection method comprising:
applying a command pressure to a physical model that expresses physical quantities of components of the pressure regulating valve based on a parameter of each of the components of the valve regulating valve to obtain a waveform of a response pressure that is a pressure of the fluid output by the pressure regulating valve, the command pressure being the pressure of the fluid output by the conversion valve, and identifying a degraded component among the components of the pressure regulating valve from a value of the parameter of the physical model that are used for obtaining a waveform, among the found waveforms of the response pressure, that matches a waveform of the detected response pressure.

* * * * *